US008607824B2

(12) United States Patent
Brummitt

(10) Patent No.: US 8,607,824 B2
(45) Date of Patent: Dec. 17, 2013

(54) VALVE AND DISPENSER USING THE VALVE

(75) Inventor: Richard Brummitt, Basingstoke (GB)

(73) Assignee: P.C. Cox Limited, Berkshire (GB)

( * ) Notice: Subject to any disclaimer, the term of this patent is extended or adjusted under 35 U.S.C. 154(b) by 0 days.

(21) Appl. No.: 13/336,480

(22) Filed: Dec. 23, 2011

(65) Prior Publication Data
US 2012/0160875 A1 Jun. 28, 2012

(30) Foreign Application Priority Data

Dec. 23, 2010 (EP) .................................. 10196810

(51) Int. Cl.
F16K 11/07 (2006.01)

(52) U.S. Cl.
USPC ...................... 137/625.69; 222/389

(58) Field of Classification Search
USPC .................. 222/327, 326, 334, 389, 256; 137/625.25, 625.67, 625.69, 596
See application file for complete search history.

(56) References Cited

U.S. PATENT DOCUMENTS

| 2,388,662 | A | * | 11/1945 | Anderson et al. ............... 91/355 |
| 2,582,156 | A | | 1/1952 | Peterson |
| 2,692,706 | A | | 10/1954 | Carl |
| 2,705,463 | A | | 4/1955 | Moore |
| 2,839,945 | A | | 6/1958 | Zion |
| 2,840,276 | A | * | 6/1958 | Dreyer, Jr. et al. ......... 222/185.1 |
| 3,254,806 | A | | 6/1966 | Niels |
| 3,353,537 | A | * | 11/1967 | Knox et al. .................... 604/143 |
| 3,431,953 | A | * | 3/1969 | Rutherford .................... 141/361 |
| 3,559,687 | A | * | 2/1971 | Aslan ....................... 137/625.69 |
| 3,740,612 | A | | 6/1973 | Gauthier et al. |
| 3,768,472 | A | | 10/1973 | Hodosh et al. |
| 3,780,384 | A | * | 12/1973 | Rivelle ............................. 4/367 |
| 3,819,115 | A | | 6/1974 | Soderman |
| 3,980,209 | A | | 9/1976 | Collar |
| 4,029,236 | A | | 6/1977 | Carson, Jr. et al. |

(Continued)

FOREIGN PATENT DOCUMENTS

| CH | 329614 | 4/1958 |
| DE | 1784336 | 8/1971 |

(Continued)

OTHER PUBLICATIONS

European Search Report for European Application No. 10196812.1 dated Mar. 9, 2012.

(Continued)

Primary Examiner — Paul R Durand
Assistant Examiner — Charles P Cheyney
(74) Attorney, Agent, or Firm — Patterson Thuente Pedersen, P.A.

(57) ABSTRACT

A valve for a pneumatic dispenser, the dispenser comprising a handle with an actuation arrangement for selectively applying pressure to a respective one of the front and rear chambers on either side of a piston coupled to a rod for applying a dispensing force, thereby controlling movement of the rod. The valve is provided with a body and first and second moveable members moveable relative to the body. The valve can be arranged as a space saving five port valve instead of two three port valves for use in the disclosed dispenser and can be arranged to provide a fail safe mechanism if both valve members are actuated concurrently. A dispenser comprising a stock portion and a cylinder secured to the stock portion is disclosed. Pressure is supplied to the rear chamber of the cylinder from the stock portion through its front chamber and the piston moveable inside the cylinder.

13 Claims, 11 Drawing Sheets

(56) References Cited

U.S. PATENT DOCUMENTS

| | | | |
|---|---|---|---|
| 4,116,364 A * | 9/1978 | Culbertson et al. | 222/40 |
| 4,171,072 A | 10/1979 | Davis, Jr. | |
| 4,174,068 A | 11/1979 | Rudolph | |
| 4,264,021 A | 4/1981 | Davis, Jr. | |
| 4,273,269 A | 6/1981 | Davis, Jr. | |
| 4,290,091 A | 9/1981 | Malcolm | |
| 4,322,022 A | 3/1982 | Bergman | |
| 4,366,919 A | 1/1983 | Anderson | |
| 4,376,498 A | 3/1983 | Davis, Jr. | |
| 4,472,141 A | 9/1984 | Dragan et al. | |
| 4,757,628 A | 7/1988 | Bulfer | |
| 5,125,836 A | 6/1992 | Dragan et al. | |
| 5,127,552 A * | 7/1992 | Bauman et al. | 222/145.5 |
| D329,277 S | 9/1992 | Keske et al. | |
| 5,163,584 A * | 11/1992 | Huber et al. | 222/1 |
| 5,277,099 A * | 1/1994 | Powers | 91/350 |
| 5,301,842 A | 4/1994 | Ritter | |
| 5,370,282 A | 12/1994 | Sedlmeier | |
| 5,489,207 A | 2/1996 | Dragan et al. | |
| 5,558,277 A | 9/1996 | Owen et al. | |
| D394,994 S | 6/1998 | Dreve | |
| 5,860,739 A | 1/1999 | Cannon et al. | |
| D411,421 S | 6/1999 | Mayeur | |
| 6,116,902 A | 9/2000 | Schodel et al. | |
| 6,401,988 B1 | 6/2002 | Parent et al. | |
| 6,412,667 B1 | 7/2002 | Huang | |
| 6,454,138 B1 | 9/2002 | Greenhill et al. | |
| D479,305 S | 9/2003 | Zittel et al. | |
| 6,929,157 B2 | 8/2005 | Orecchia et al. | |
| D583,639 S | 12/2008 | Axinte et al. | |
| D588,231 S | 3/2009 | Pellin et al. | |
| 7,632,251 B2 | 12/2009 | Lin et al. | |
| D608,858 S | 1/2010 | Baltz et al. | |
| D649,221 S | 11/2011 | Sinders et al. | |
| D660,105 S | 5/2012 | Brummitt | |
| D660,663 S | 5/2012 | Brummitt | |
| 2002/0092871 A1 | 7/2002 | Rickard | |
| 2004/0126733 A1 | 7/2004 | Ronvig | |
| 2004/0216591 A1 | 11/2004 | Assadi et al. | |
| 2007/0102457 A1 | 5/2007 | Campbell et al. | |
| 2008/0149216 A1 | 6/2008 | Speck | |
| 2011/0095054 A1 | 4/2011 | Hughes | |
| 2012/0160877 A1 | 6/2012 | Brummitt | |

FOREIGN PATENT DOCUMENTS

| | | |
|---|---|---|
| DE | 3031939 | 8/1980 |
| DE | 3420324 | 12/1985 |
| DE | 9000957 | 4/1990 |
| DE | 9011965 | 10/1990 |
| DE | 102005038621 | 3/2007 |
| EP | 0276665 | 8/1988 |
| EP | 0406113 | 6/1990 |
| EP | 0443611 | 2/1991 |
| EP | 0436155 | 7/1991 |
| EP | 0448375 | 9/1991 |
| EP | 0525562 | 7/1992 |
| EP | 0551998 | 1/1993 |
| FR | 984352 | 7/1951 |
| GB | 793277 | 4/1958 |
| GB | 1589381 | 7/1977 |
| GB | 1555455 | 11/1979 |
| GB | 2276365 | 9/1994 |
| JP | H10156253 | 6/1998 |
| NL | 6602366 | 8/1966 |
| WO | WO2005/095225 | 10/2005 |
| WO | WO2006/106215 | 10/2006 |
| WO | WO2011/052891 | 5/2011 |

OTHER PUBLICATIONS

Web page printout, "Universal Coaxial Adhesive Dispenser", printed Jun. 24, 2009 http://www.5mix.com/Universal%20Dispenser.htm.
Cox Sealant Applicators, Jun. 17, 2008. http://www.toolbarn.com/product/CCM-380-10/.
GB Search Report from GB Application No. GB0918585.1 dated May 11, 2010.
Application and File History of U.S. Appl. No. 12/978,695, filed Dec. 27, 2010, inventor Brummitt.
Application and File History for U.S. Appl. No. 12/910,462, filed Oct. 22, 2010, inventor Hughes.
Web page printout, "Complet Applicator Super Strong Single-dose applicator", Dec. 20, 2010. http://www.sdi.com.au/en.complet-applicator/.
Web page printout, "Complet Applicator (SDI) Interguide Dental and Medical Supply", Dec. 20, 2010. http://interguidedental.com/Complet-Applicator-SDI-p13579.html.
European Search Report for European Application No. EP91102643 dated Oct. 3, 1991.
European Search Report for European Application No. EP90401861 dated Mar. 13, 1991.
European Extended Search Report for European Application No. 10196812.1 dated Jul. 11, 2011.
European Extended Search Report of European Application No. 10196810.5 dated Jul. 19, 2011.
European Extended Search Report of European Application No. 10196813.9 dated Jun. 28, 2011.
European Extended Search Report of European Application No. 10196816.2 dated Jun. 22, 2011.
International Search Report of International Application No. PCT/FR2006/000710 dated Jul. 13, 2006.
Application and File History of Design U.S. Appl. No. 29/394,883, filed Jun. 22, 2011, inventor Brummitt.
Application and File History of Design U.S. Appl. No. 29/394,887, filed Jun. 22, 2011, inventor Brummitt.
Application and File History of Design U.S. Appl. No. 29/394,891, filed Jun. 22, 2011, inventor Brummitt.
Application and File History for U.S. Appl. No. 13/336,462, filed Dec. 23, 2011, inventor Brummitt.
Application and File History for U.S. Appl. No. 13/336,517, filed Dec. 23, 2011, inventor Brummitt.
Korean Office Action from Korean Application No. 10-2011-0140003 dated Jun. 30, 2013. English translation provided.
Japanese Office Action from Japanese Application No. 2011-283327, drafting date Jun. 25, 2013. English Translation provided.

* cited by examiner

VALVE AND DISPENSER USING THE VALVE

RELATED APPLICATION

The present application claims priority to EP Application No. 10196810.5 filed Dec. 23, 2010, which is incorporated herein in its entirety by reference.

FIELD OF THE INVENTION

The present invention relates to a valve, particularly although not exclusively, a five port valve. The valve finds application in a pneumatic dispenser, particularly but not exclusively, for applying a force to a container holding viscous material to cause the viscous material to be dispensed from the container.

SUMMARY

European Patent Application EP0551998 A1 discloses a dispenser for viscous material. The dispenser comprises an actuating cylinder containing a piston connected to a rod which extends forward out of the cylinder, and a pistol grip body, in which is mounted a trigger operably connected with a pressure regulator. Actuation of the trigger causes a pressure to be applied to the cylinder via a flexible pipe extending from a regulated two port valve inside the pistol grip to the rear end of the cylinder. The applied pressure causes the piston and, hence, the rod to move forward. A keep is located forward of the cylinder. The keep enables a removable cartridge to be inserted such that application of a force by the rod to a piston inside the cartridge causes viscous material to be dispensed from the cartridge through an aperture. A switch located at an end of the pistol grip distal to the cylinder is used to select between different outlets leading to opposite sides of the piston to enable the piston to be pneumatically driven in either the forward or the rearward direction, according to the selection of the switch. In either case, the pressure is vented from the cylinder after the trigger is released by a dump valve at the rear of the cylinder. When pressure is applied on actuation of the trigger, the dump valve closes until the applied pressure drops when the trigger is released and the dump valve opens to act as a rapid exhaust.

Dispensers of a similar general construction as disclosed in EP0551998 A1 are known, which also have a flexible pipe extending from the pistol grip to the rear of the cylinder but have a button at the rear of the cylinder that allows the operator to control whether the pressure applied through the flexible pipe from the pistol grip is applied directly to the rear portion of the cylinder on one side of the piston, or through a coiled tube and the piston to the front portion of the cylinder on the other side of the piston. As for EP0551998, a pressure activated dump valve is used to vent the cylinder to atmosphere when the trigger is released.

A common feature of these dispensers is that, in order to change the direction of movement of the piston, the operator must either use two hands or at least move the hand holding the pistol grip from its normal position with the index finger of this hand on the trigger. This causes delays in the operation of the dispenser while the operator moves his hand(s) in order to make the necessary adjustments to the dispenser. Another common feature of these dispensers is that a flexible pipe extends from the pistol grip to the rear end of the cylinder. This flexible pipe hangs loosely from the cylinder and can be a safety hazard. It is also prone to damage and can detract from the visual appearance of the dispenser. The operation of the dump valve to vent the cylinder can involve high levels of noise.

U.S. Pat. No. 2,692,706 discloses an air pressure caulking gun with a pair of longitudinally spaced apart air control valves in a valve block actuated by a pivotally mounted trigger member. A trigger finger sits on a valve seat of each control valve to regulate a flow of compressed air to the ports that supply or exhaust air from the valve ports.

One aspect of the invention provides a dispenser comprising a handle. A cylinder is secured with respect to the handle. A piston is moveable inside the cylinder, the piston dividing the cylinder into a front chamber and a rear chamber. A rod is arranged to move with the piston, the rod extending from the piston through an aperture in a front end of the cylinder. The handle houses a valve, comprising a body and first and second moveable members linked to an actuation arrangement for controlling the advance and retreat of the rod by actuation of a respective one of the first and second members. The body defines a valve chamber and first, second, third, fourth and fifth ports into the valve chamber, the second and fourth ports being connected to, respectively, the rear and front chamber. The first and second members are moveable within the valve chamber to selectively open and close fluidic communication paths between the ports. The first member is movable between two positions to selectively enable fluidic communication between the second port and either the first port or the third port. The second member is movable between two positions to selectively enable fluidic communication between the fourth port and either the third port or the fifth port.

Advantageously, a dispenser with a compact five-port valve can be constructed, in effect combining two three port valves in a single valve body by sharing one of the ports of each notional three port valve. In some embodiments, the second and fourth ports are connected as operating ports (for example to either side of the piston in a dispenser as described above), one of the first, third and fifth ports being connected as a supply or exhaust port and the other two being connected as the exhaust or supply ports, respectively. Space savings are achieved by allowing the operating ports to share a common exhaust or inlet port. A fail-safe may be provided by preventing substantial pressure build-up at both operating ports at the same time.

In some embodiments, the first and second members are constrained to move along the same axis and the first and second members may be biased away from each other into respective rest positions. A resilient biasing member may be disposed between the first and second members to this end. In some embodiments, the members are dimensioned such that the possible travel of each of the members is determined by the position of the other one of the members, for example, the members can be arranged to contact each other if one of the members is fully inserted into the chamber. The members may be arranged to be capable of contacting each other inside the chamber to limit how much both members can be inserted at the same time.

In some embodiments the first, third and fifth ports are in fluidic communication in configurations of the first and second members with both the first and second members positioned away from their respective rest positions. Where the second and fourth ports are connected as operating ports, it is thus ensured that pressure applied via one or more of the first, third and fifth ports is vented through another one or more of these ports, which are connected as exhaust ports, if both members are actuated at the same time.

In some embodiments, for example with the first and fifth port connected to supply pressure to the second and fourth port connected as operating ports and the third port connected as an exhaust port, when the first and second members are in their respective rest positions, fluidic communication is enabled between the second port and the third port, and between the third port and the fourth port, and fluidic communication is prevented between the first port and the second port, and between the fourth port and the fifth port; when the first member is positioned as closely as possible to the second member while the second member remains in its rest position, fluidic communication is enabled between the second port and the third port, and between the fourth port and the fifth port, and fluidic communication is prevented between the first port and the second port, and between the third port and the fourth port; when the second member is positioned as closely as possible to the first member while the first member remains in its rest position, fluidic communication is enabled between the first port and the second port, and between the third port and the fourth port, and fluidic communication is prevented between the second port and the third port, and between the fourth port and the fifth port. There is no configuration in this embodiment of the first and second members in which fluidic communication is enabled between the first port and the second port, and between the fourth port and the fifth port, without at least one of the second port and the fourth port also being in fluidic communication with the third port.

In some embodiments, for example with the first and fifth port connected as exhaust ports for the second and fourth port connected as operating ports and the third port connected to supply pressure, when the first and second members are in their respective rest positions, fluidic communication is enabled between the first port and the second port, and between the fourth port and the fifth port, and fluidic communication is prevented between the second port and the third port, and between the third port and the fourth port; when the first member is positioned as closely as possible to the second member while the second member remains in its rest position, fluidic communication is enabled between the first port and the second port, and between the third port and the fourth port, and fluidic communication is prevented between the second port and the third port, and between the fourth port and the fifth port; when the second member is positioned as closely as possible to the first member while the first member remains in its rest position, fluidic communication is enabled between the second port and the third port, and between the fourth port and the fifth port, and fluidic communication is prevented between the first port and the second port, and between the third port and the fourth port. In this embodiment there is no configuration of the first and second members in which fluidic communication is enabled between the second port and the third port, and between the third port and the fourth port, without the first port being in fluidic communication with the second port and/or the fourth port being in fluidic communication with the fifth port.

In some embodiments, the first and fifth port are connected to a pressure supply arrangement and the third port is connected to an exhaust arrangement, saving space in particular if the exhaust arrangement comprises a silencer. In some embodiments, the pressure supply arrangement comprises a respective pressure regulator for each of the first and fifth ports, allowing the pressure to be adapted for each chamber, for example using a lower pressure to retreat the rod, thereby saving air when less force is needed. In some embodiments, the rod extends from the piston through the front space. A first fluid conduit is provided for enabling a pressure to be applied from the stock portion to the rear space to advance the rod. The first fluid conduit passes through the front space. This enables the rod to be driven forward without the need for a tube external to the cylinder between the handle and the cylinder.

Advantageously, the stock portion and the cylinder can together fully enclose the first fluid conduit. The valve arrangement and the cylinder are then arranged to be in fluidic communication entirely through fluid paths contained within the dispenser, i.e. through the handle and passing directly into the cylinder without first leaving the handle. This ensures that the dispenser is compact, and provides a simpler form factor of the dispenser due to the absence of any visible external fluid paths. The dispenser is also safer as all fluid paths are contained within the dispenser and not exposed, and therefore are less liable to be damaged.

In some embodiments, the first conduit passes through an aperture in the piston so that the piston slides along the conduit. In some embodiments, the dispenser further comprises a second fluid conduit passing from the stock portion to the front space for enabling a pressure to be applied to the front space to retreat the rod, the second fluid conduit passing directly from the stock portion to the front space. In some embodiments, the stock portion and the cylinder fully enclose the first and second fluid conduits. An actuation arrangement may be provided to control the application of pressure via the first and second conduits to advance and retreat the rod.

Any of the dispensers described above may comprise a holder for holding a container, such as a cartridge or foil pack, containing viscous material to enable application of a dispensing force to the container as the rod advances, thereby dispensing at least some of the viscous material from the container.

BRIEF DESCRIPTION OF THE DRAWINGS

Embodiments of the invention are now described by way of example only and with reference to the accompanying drawings, in which.

DETAILED DESCRIPTION

Figure 1:
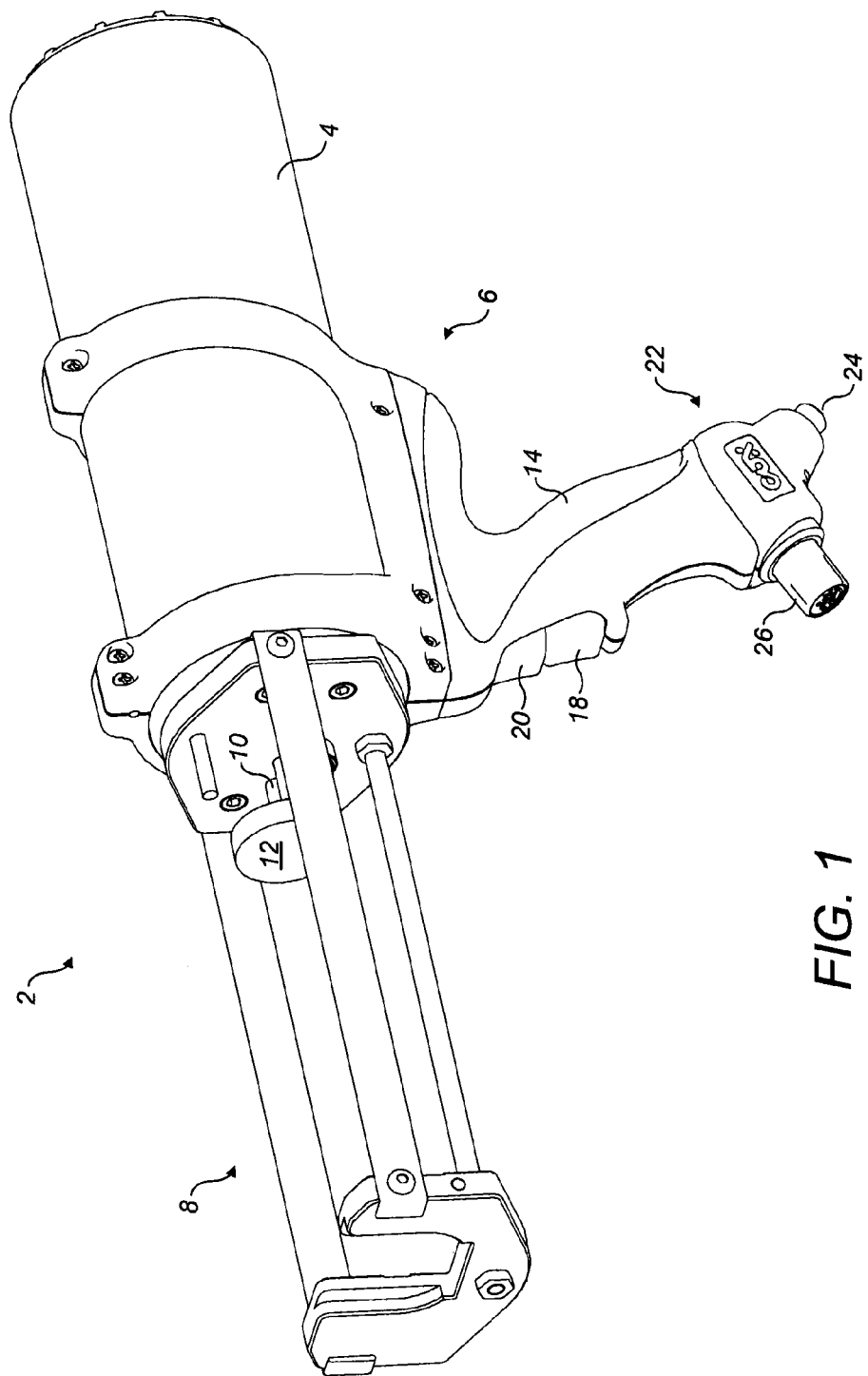
FIG. 1 depicts a perspective view of a dispenser.

With reference to FIG. 1, a pneumatic dispenser 2 comprises a cylinder 4 secured to a stock portion 6 and a cartridge holder 8 secured forward of the cylinder 4. The cylinder has a wall with a substantially annular cross-section. The cartridge holder 8 is arranged to receive a cartridge (not shown) containing viscous material and is arranged such that the cartridge held in the cartridge holder 8 is disposed in a dispensing relationship relative to the cylinder 4, as described below.

The specific embodiment depicted in FIG. 1 is arranged to dispense material from two component cartridges having two barrels, one for each component material and has two plungers, one for each barrel. A plurality of rods 10 extend through a front end of the cylinder 4 through respective apertures, which seal around the rods 10. The rods 10 extend substantially parallel to a longitudinal axis of the cylinder 4. A plunger 12 for engaging a piston inside the cartridge is coupled to two of the rods 10 at a forward end of the rods 10. A further, smaller plunger is coupled to the remaining rod. The smaller plunger and remaining rod are obscured behind the cartridge holder 4 in FIG. 1. The rods 10 and the plungers 12 are moveable relative to the cylinder 4 along a longitudinal axis of the rods 10 such that a force can be applied to the cartridge by the plungers 12 when the cylinder 4 is pressurized to cause viscous material to be dispensed from the cartridge.

The stock portion 6 comprises a handle 14 extending away from the cylinder 4 in the vicinity of the front end of the cylinder 4. The handle 14 is ergonomically shaped to be held by one hand of a human operator of the dispenser 2 and comprises a drive trigger 18 and a return trigger 20 for, respectively, controlling the advance and return (i.e. retreat) of the rods 10. The drive trigger 18 and the return trigger 20 face substantially forward and are positioned on the handle 14 such that each trigger can be individually depressed by the operator while the operator's hand is holding the handle 14. The drive trigger 18 is positioned on the handle 14 further from the cylinder 4 such that it is actuatable by the middle finger of the operator's hand, and the return trigger 20 is positioned on the handle 14 closer to the cylinder 4 such that it is actuatable by the index finger of the operator's hand. The handle 14 also comprises a regulator 22 at an end of the handle 14 distal to the cylinder 4. The regulator 22 has a quick release pressure connector 24 arranged to connect to a pressure hose to receive pressurized fluid (for example, compressed air) from a pressure source (not shown) and a dial 26 for controlling the pressure of the pressurized fluid supplied by the regulator 22.

Figure 2:
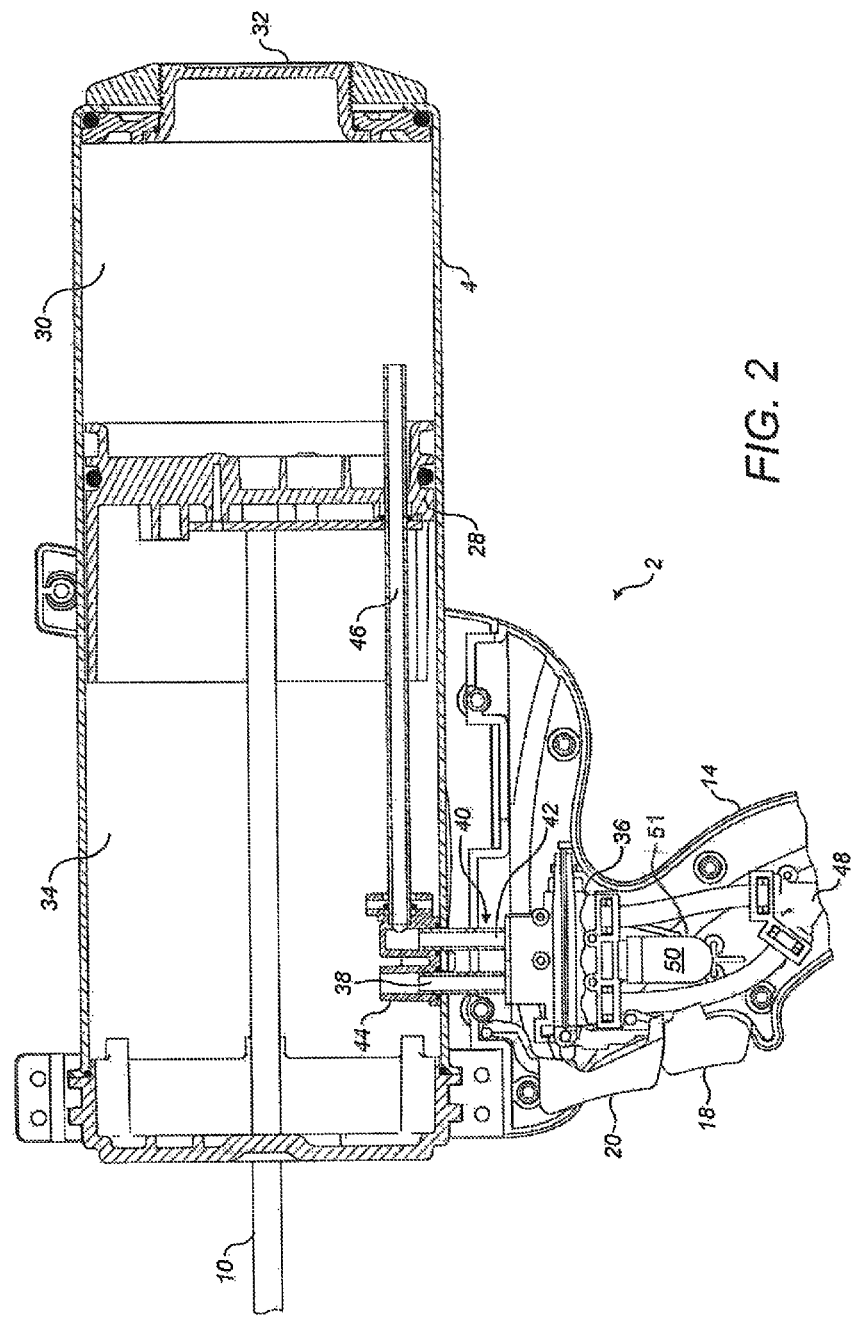
FIG. 2 depicts a cross-section of part of the dispenser.
Figure 3:
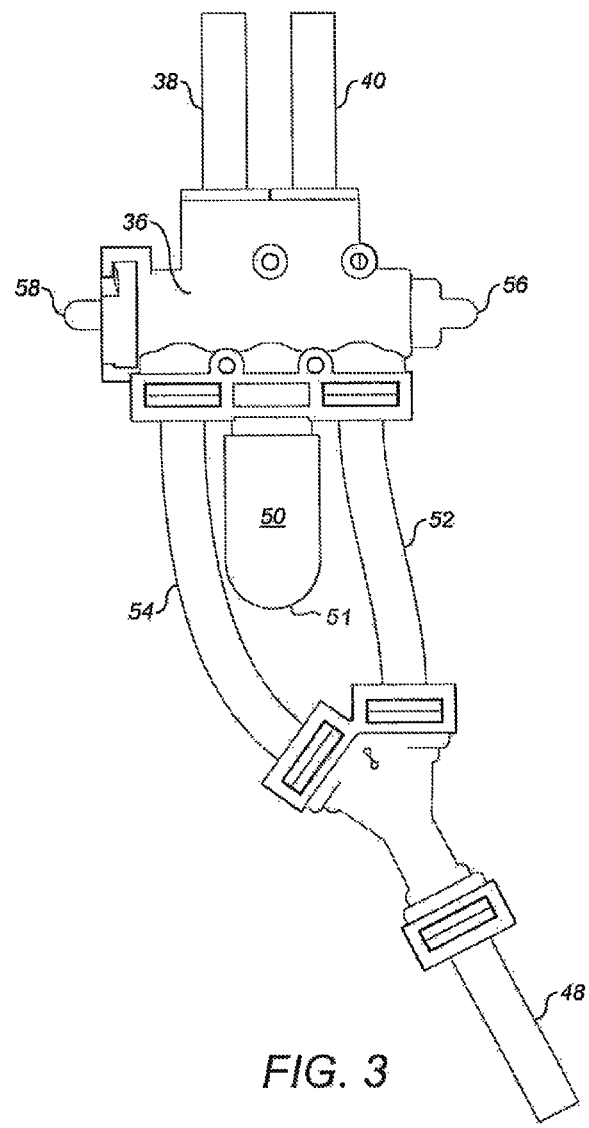
FIG. 3 depicts a valve arrangement and associated components.

With reference to FIG. 2, depicting a cross-section of the dispenser with one of the rods 10 visible, a piston 28 coupled to the rods 10 for driving the rods 10 is slidingly accommodated within the cylinder 4. The piston 28 divides the inside of the cylinder 4 into two chambers: a drive chamber 30 on the rearward side of the piston 28 between the piston 28 and a closure member 32 closing the back end of the cylinder 4, and a return chamber 34 on the forward side of the piston 28 between the piston 28 and the apertures around the rods 10. The rods 10 are coupled to the piston 28 and extend forward of the piston 28. The rods 10 thus move with the piston 28 relative to the cylinder 4 parallel to the longitudinal axis of the cylinder 4.

A valve 36 is situated within the handle 14 so that it is actuatable by the return trigger 20 and the drive trigger 18. The return trigger 20 is arranged to directly engage a first spool (described below) of the valve and the drive trigger 18 is arranged to actuate a second spool (described below) of the valve via a yoke while the drive trigger 20 pivots about a pivot forward of the valve.

A return conduit 38 passes from the valve 36 through an aperture in the cylinder 4 into the return chamber 34 to enable fluidic communication between the valve 36 and the return chamber 34. A drive conduit 40 passing from the valve 36 to the drive chamber 30 comprises a first drive conduit portion 42, which passes from the valve 36 to the return chamber 34 through a further aperture in the cylinder 4. Fluid is prevented from escaping the return chamber 34 between the respective apertures and the outside of the first drive conduit portion 42 or the return conduit 38 by a sealing member 44. The sealing member 44 sealingly holds O-rings 80 in place around each of the return conduit 38 and the drive conduit 40 and against an inner surface of the cylinder 4 around each of the apertures. A second drive conduit portion 46 passes from the sealing member through the return chamber 34 and extends through an aperture in the piston 28 into the drive chamber 30 to enable fluidic communication between the valve 36 and the drive chamber 30. The aperture in the piston 28 seals around the second drive conduit portion 46, and the drive conduit 40 is therefore sealed from the return chamber 34. In operation, the piston 28 slides over the second drive conduit portion 46 whilst maintaining the seal around it.

The valve 36 is in fluidic communication with a pressure inlet conduit 48 connected to the regulator 22. The valve 36 is also in fluidic communication with an exhaust 50 for releasing pressure in the cylinder 4 to the atmosphere. The exhaust 50 is arranged to act as a silencer 51 in order to reduce the noise emitted from the dispenser 2 when the cylinder 4 is vented through the exhaust 50.

The valve 36 is arranged such that the pressure inlet conduit 48 and the exhaust 50 are each selectively in fluidic communication with the drive chamber 30 and the return chamber 34 under control of the triggers. Actuation of the valve 36 using the triggers enables the operator of the dispenser 2 to selectively enable or prevent fluidic communication between combinations of the pressure inlet conduit 48, the exhaust 50, the drive chamber 30 and the return chamber 34 to advance or retreat the rods 10.

In use, when neither the drive trigger 18 nor the return trigger 20 has been depressed by the operator, the dispenser 2 is in a rest configuration. In the rest configuration, the regulator 22 is disconnected from both the drive chamber 30 and the return chamber 34 and both chambers are connected to the exhaust 50, placing the drive chamber 30 and the return chamber 34 at atmospheric pressure.

When the drive trigger 18 has been fully depressed by the operator, and the return trigger 20 is not depressed, the dispenser 2 is in a drive configuration. In the drive configuration, the regulator 22 is connected the drive chamber 30 and remains disconnected from the return chamber 34, which remains connected to the exhaust 50. The exhaust 50 is disconnected from the drive chamber 30, so that pressure builds up in the drive chamber 30, driving the piston 28 and, hence, the rods 10 forward.

When the return trigger 20 has been fully depressed by the operator, and the drive trigger 18 is not depressed, the dispenser 2 is in a return configuration. In the return configuration, fluidic communication between the pressure inlet conduit 48 and the return chamber 34 is enabled, and fluidic communication between the pressure inlet conduit 48 and each of the drive chamber 30 and the exhaust 50 is prevented. Fluidic communication between the exhaust 50 and the drive chamber 30 is enabled, and fluidic communication between the exhaust 50 and the return chamber 34 is prevented. In the return configuration, pressurized fluid is applied to the return chamber 34, which causes the piston 28 to move rearwards.

When each of the drive trigger 18 and the return trigger 20 are depressed by the same amount, and each are depressed as much as they can both be depressed at the same time, the dispenser 2 is in a free flow configuration. In the free flow configuration, a pressure increase in the drive chamber 30 and/or the return chamber 34 is prevented. This is achieved by enabling fluidic communication between the drive chamber 30 and the exhaust 50 and between the return chamber 34 and the exhaust 50. Fluidic communication is also enabled between the pressure inlet conduit 48 and the exhaust 50.

When both triggers are depressed as far as possible, they are effectively coupled to each other via the spools of the valve 36, as described below, so that any inward movement of one trigger carries outward movement of the other trigger. Thus with both triggers pressed, an operator can vary between the configurations described above by varying the force applied to each trigger. However, the valve 36 and its link to the triggers are arranged such that, for any amount of depression of either or both the triggers, it is never the case that the regulator 22 is able to supply a substantial increase in pressure to both the drive chamber 30 and the return chamber 34 at the same time. Depending on the amounts of depression of the two triggers, either there is substantially no increase in pressure in each of the two chambers, or there is a substantial increase in pressure in only one of the chambers.

The configurations of the dispenser 2, and in particular the valve 36 are now described in more detail with reference to FIGS. 3, 4A, 5A, 6A and 7A. The valve 36 comprises a valve body 60, which defines a substantially cylindrical valve chamber 62. The valve body 60 defines a return inlet port 64, a return operating port 66, an exhaust port 68, a drive operating port 70 and a drive inlet port 72, arranged consecutively with respect to the longitudinal axis of the valve chamber 62. The pressure inlet conduit 48, which is connected to the regulator 22, bifurcates between the regulator 22 and the valve 36, such that a drive inlet conduit 52 is connected to the drive inlet port 72 and a return inlet conduit 54 is connected to the return inlet port 64. The exhaust 50 is connected to the exhaust port 68.

A drive spool 56 and a return spool 58 are each moveable within the valve 36 to actuate the valve 36. As shown in FIG. 2 and discussed above, the drive trigger 18 is connected to the drive spool 56, and the return trigger 20 is connected to the return spool 58 by respective mechanical links, which cause each spool to move as each respective trigger is depressed.

The drive spool 56 and the return spool 58 are situated in the valve chamber 62 and are moveable within the valve chamber 62 substantially along the longitudinal axis of the valve chamber 62. Each spool extends through a respective aperture in the valve body 60 at opposite ends of the valve chamber 62 along the longitudinal axis. A spring 74 is situated within the valve chamber 62 between the drive spool 56 and the return spool 58. The spring 74 is in compression and exerts a force on the spools which acts to move them apart. A maximum separation distance of the drive spool 56 and the return spool 58 is defined by a first stop 76 and a second stop 78, each defined by the valve body 60, and each acting to prevent movement of the drive spool 56 and the return spool 58, respectively, beyond a maximum separation distance.

Figure 4A:
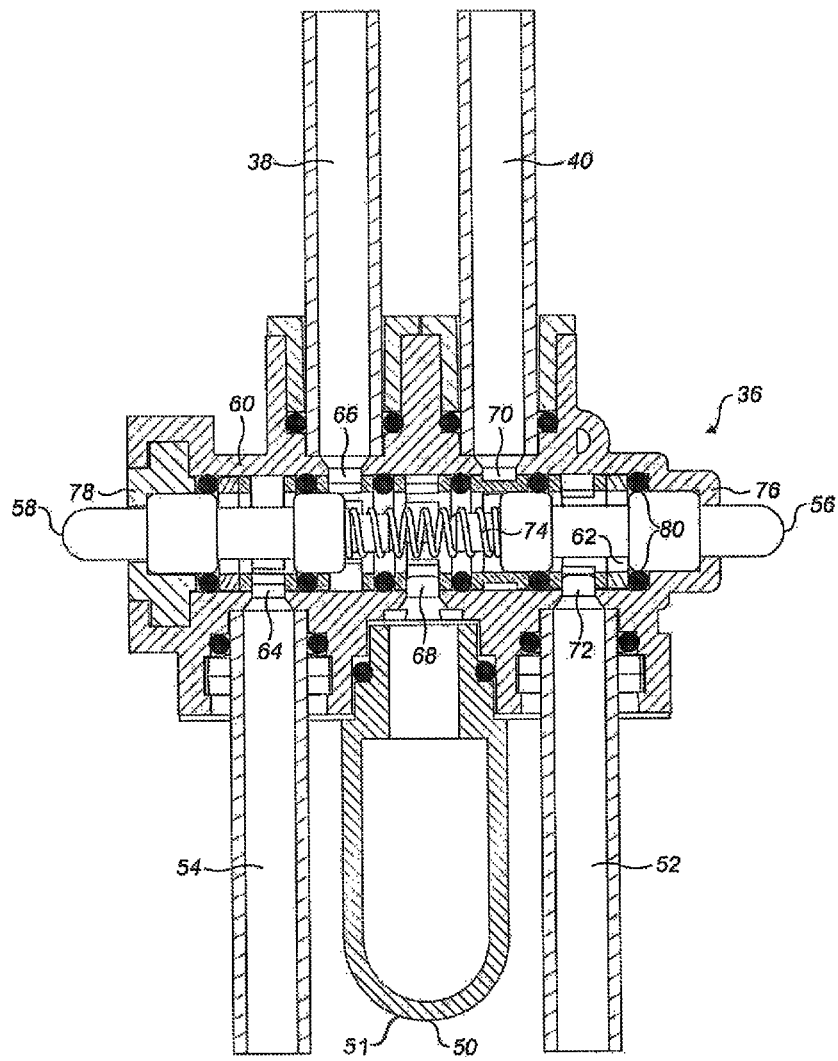
FIG. 4A depicts a cross-section of the valve arrangement in a rest configuration.
Figure 4B:
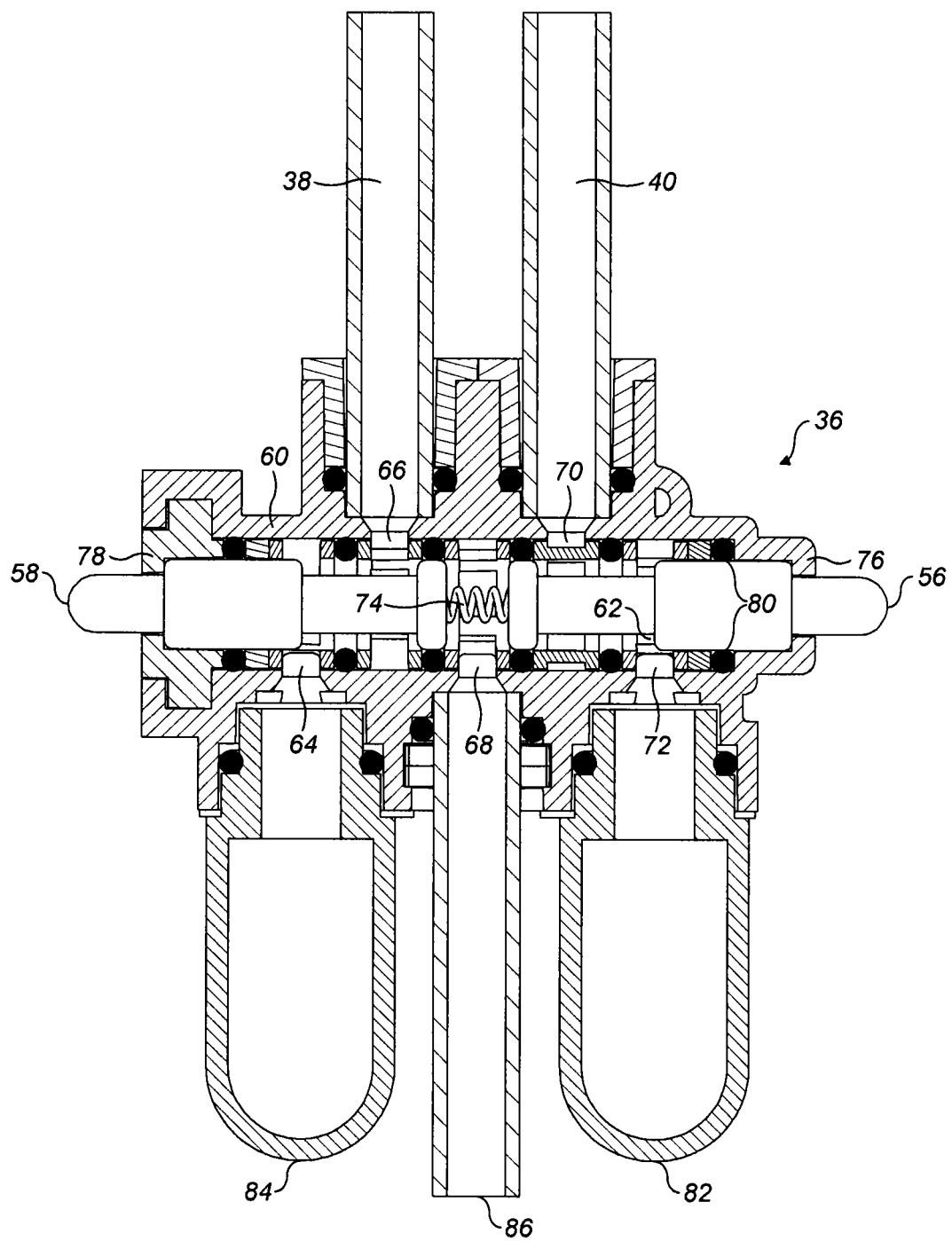
FIG. 4B depicts a cross-section of another embodiment of the valve arrangement in the rest configuration.

Each spool comprises lands and grooves as shown, for example, in FIG. 4A. A plurality of O-rings 80 are positioned in the valve chamber 62 as shown, for example, in FIG. 4A to define adjacent regions of space along the valve chamber 62 between pairs of the O-rings 80. Each region of space contains one of the five ports. When a land of either of the spools is situated within one of the O-rings 80, fluidic communication between the two regions of space on either side of that O-ring 80 is prevented, and therefore fluidic communication between the two ports associated with the two regions of space is prevented. Given the consecutive arrangement of the regions of space along the valve chamber 62, if, for example, fluidic communication between the return inlet port 64 and the return operating port 66 is prevented, fluidic communication is also prevented between the return inlet port 64 and any of the other ports.

Each of the ports and each of the apertures through which the spools extend out of the valve body 60 are individually sealed by respective O-rings 80 to prevent fluid from escaping from or entering the valve chamber 62 other than through the valve ports.

With reference to FIG. 4A, in the rest configuration, the spools 56, 58 are at their maximum separation distance, and are positioned such that fluidic communication between the return inlet port 64 and the return operating port 66 is prevented, fluidic communication between the return operating port 66 and the exhaust port 68 is enabled, fluidic communication between the exhaust port 68 and the drive operating port 70 is enabled, and fluidic communication between the drive operating port 70 and the drive inlet port 72 is prevented, connecting the cylinder 4 on either side of the piston 28 to the atmosphere, so that the piston is not driven.

Figure 5A:
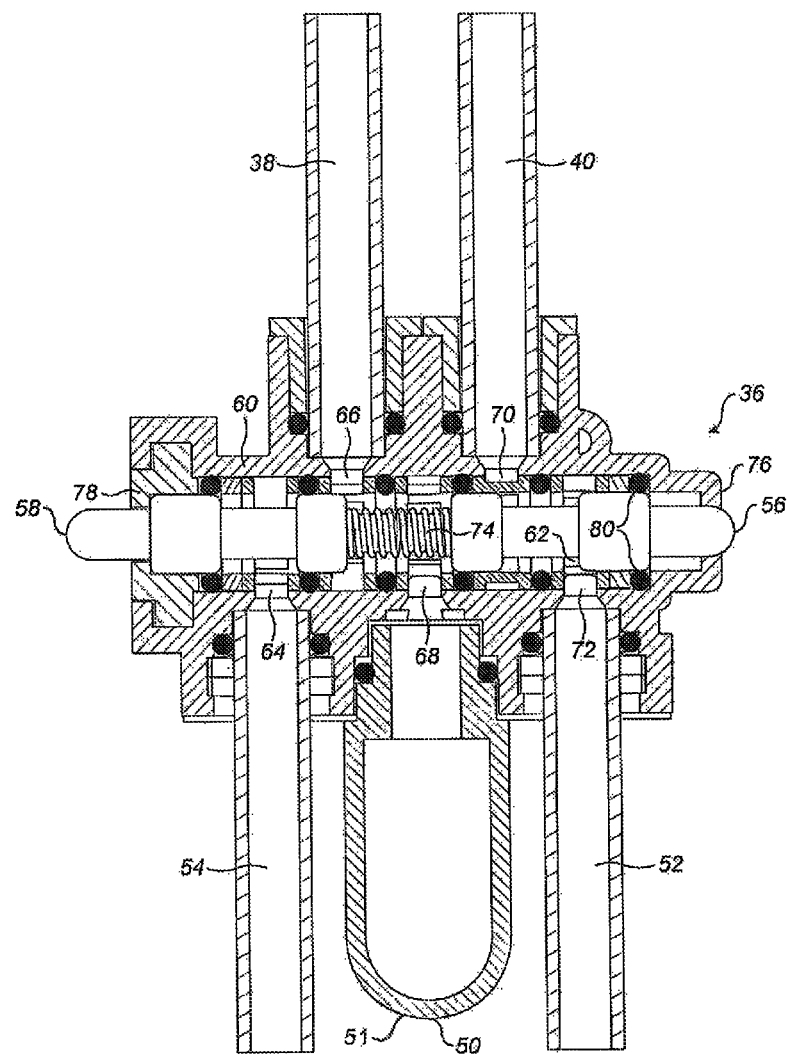
FIG. 5A depicts a cross-section of the valve arrangement in a drive configuration.
Figure 5B:
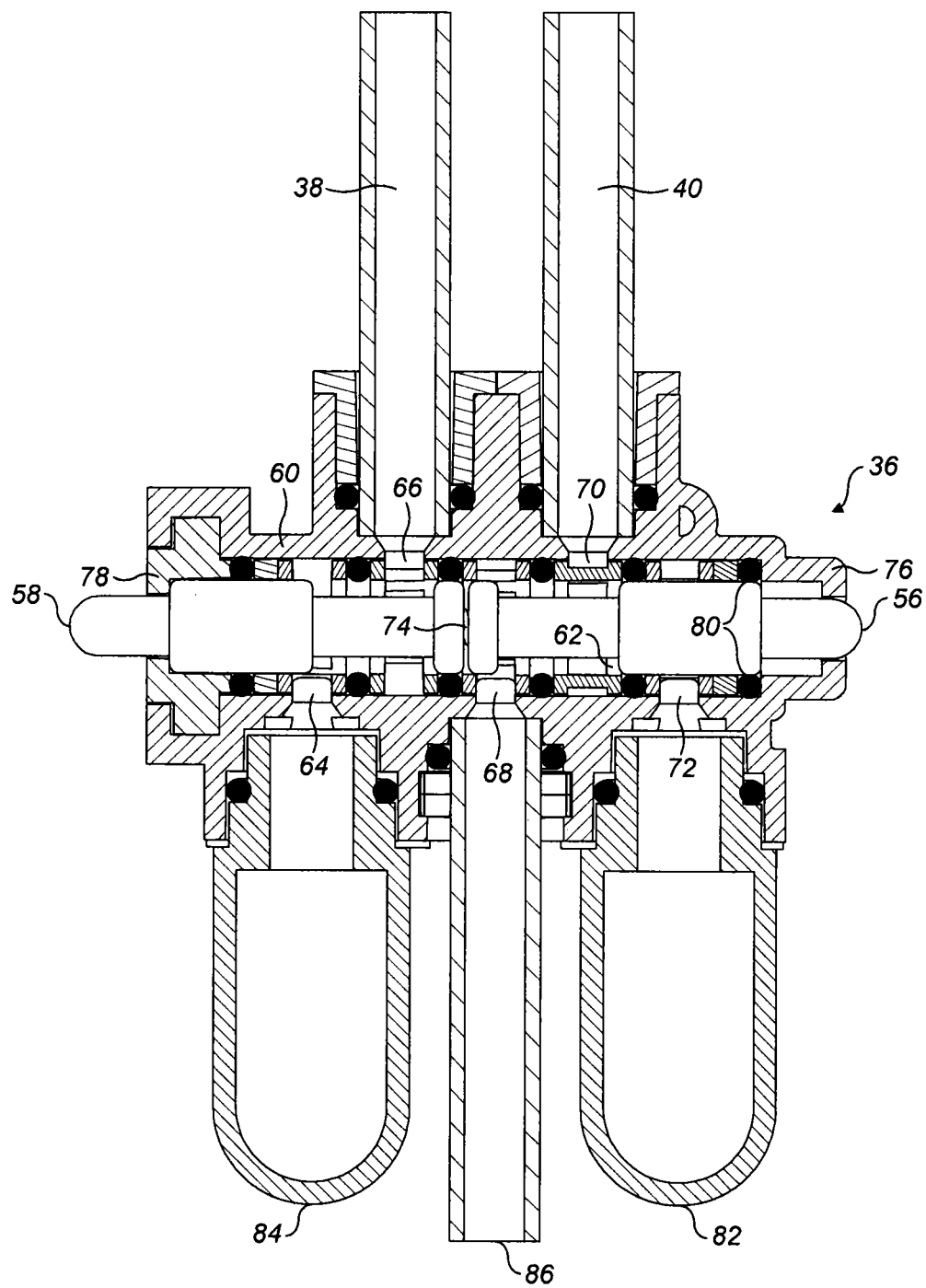
FIG. 5B depicts a cross-section of the other embodiment of the valve arrangement in the drive configuration.

With reference to FIG. 5A, in the drive configuration, the drive spool 56 has been moved by the drive trigger 18 from its position in the rest configuration towards the return spool 58 to abut the return spool 58. The spools are positioned such that fluidic communication between the return inlet port 64 and the return operating port 66 is prevented, fluidic communication between the return operating port 66 and the exhaust port 68 is enabled, fluidic communication between the exhaust port 68 and the drive operating port 70 is prevented, and fluidic communication between the drive operating port 70 and the drive inlet port 72 is enabled, connecting the drive operating port 70 to the regulator 22 to apply a drive pressure to cause the piston 28 and hence the rods 10 to advance.

Figure 6A:
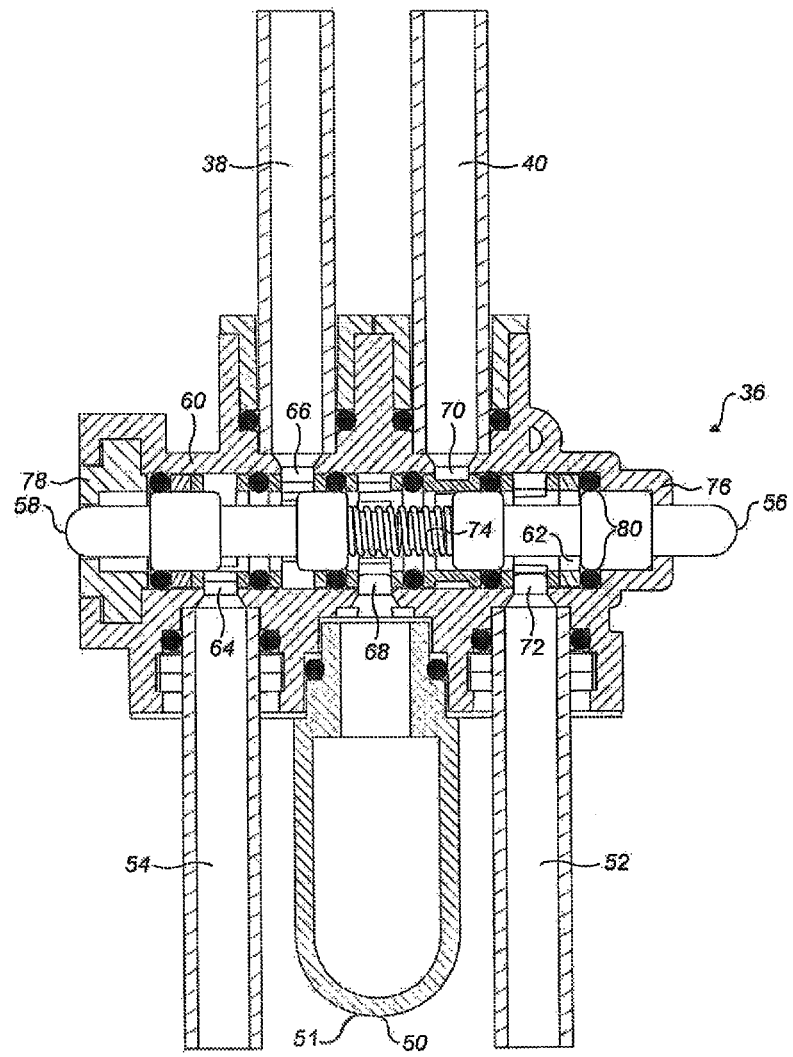
FIG. 6A depicts a cross-section of the valve arrangement in a return configuration.
Figure 6B:
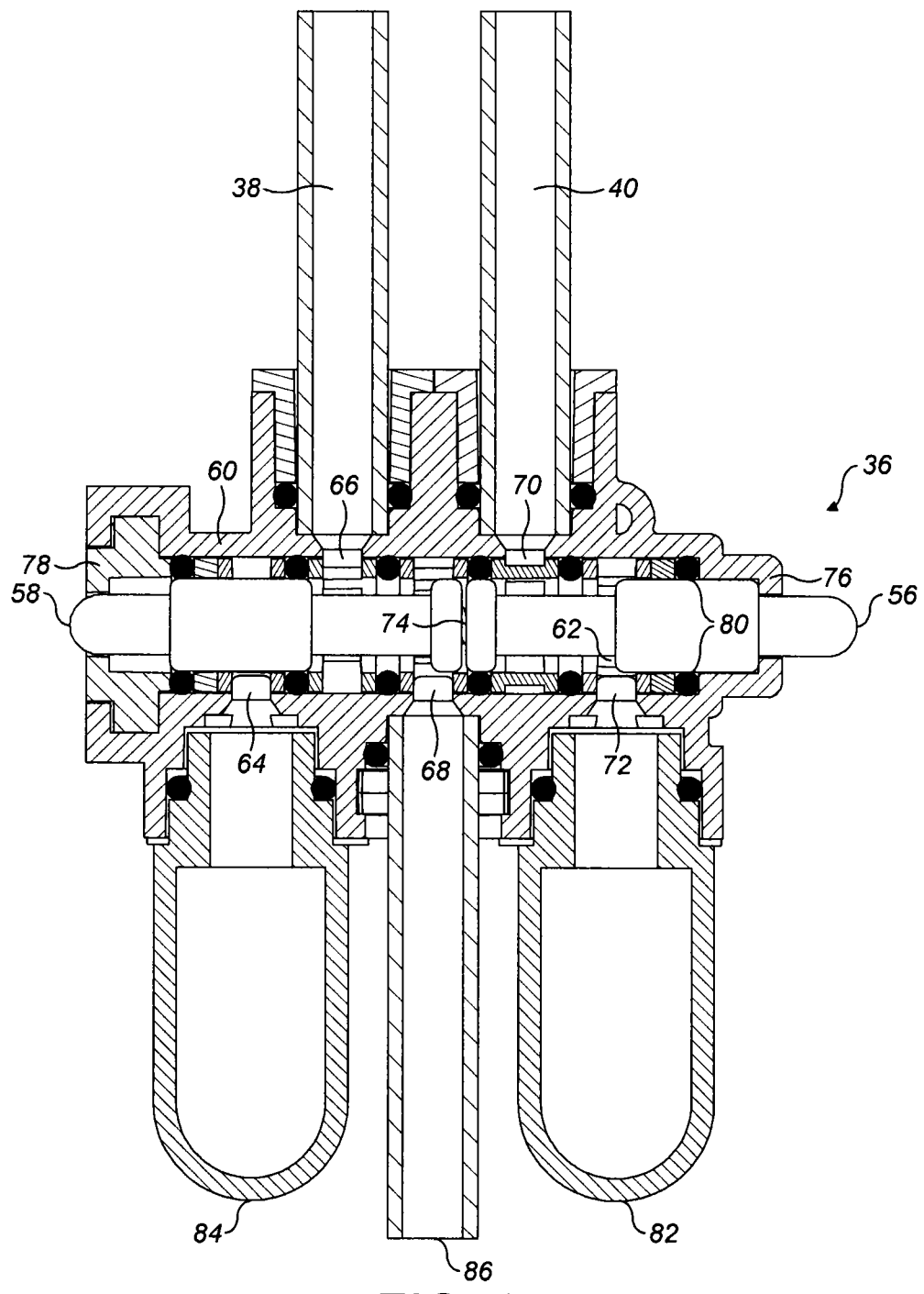
FIG. 6B depicts a cross-section of the other embodiment of the valve arrangement in the return configuration.

With reference to FIG. 6A, in the return configuration, the return spool 58 has been moved from its position in the rest configuration towards the drive spool 56 to abut the drive spool 56. The spools are positioned such that fluidic communication between the return inlet port 64 and the return operating port 66 is enabled, fluidic communication between the return operating port 66 and the exhaust port 68 is prevented, fluidic communication between the exhaust port 68 and the drive operating port 70 is enabled, and fluidic communication between the drive operating port 70 and the drive inlet port 72 is prevented, connecting the return operating port 66 to the regulator 22 to apply a return pressure to cause the piston 28 and, hence, the rods 10 to retreat.

Figure 7A:
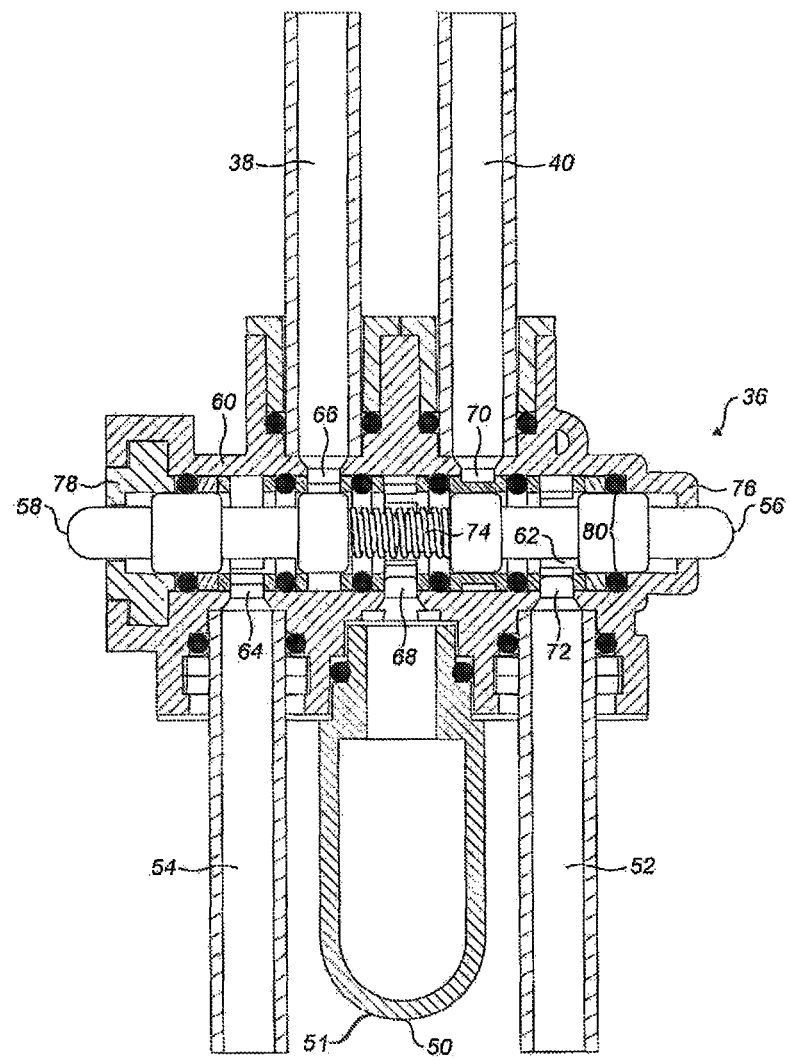
FIG. 7A depicts a cross-section of the valve arrangement in a configuration in which each of its two spools has been depressed.
Figure 7B:
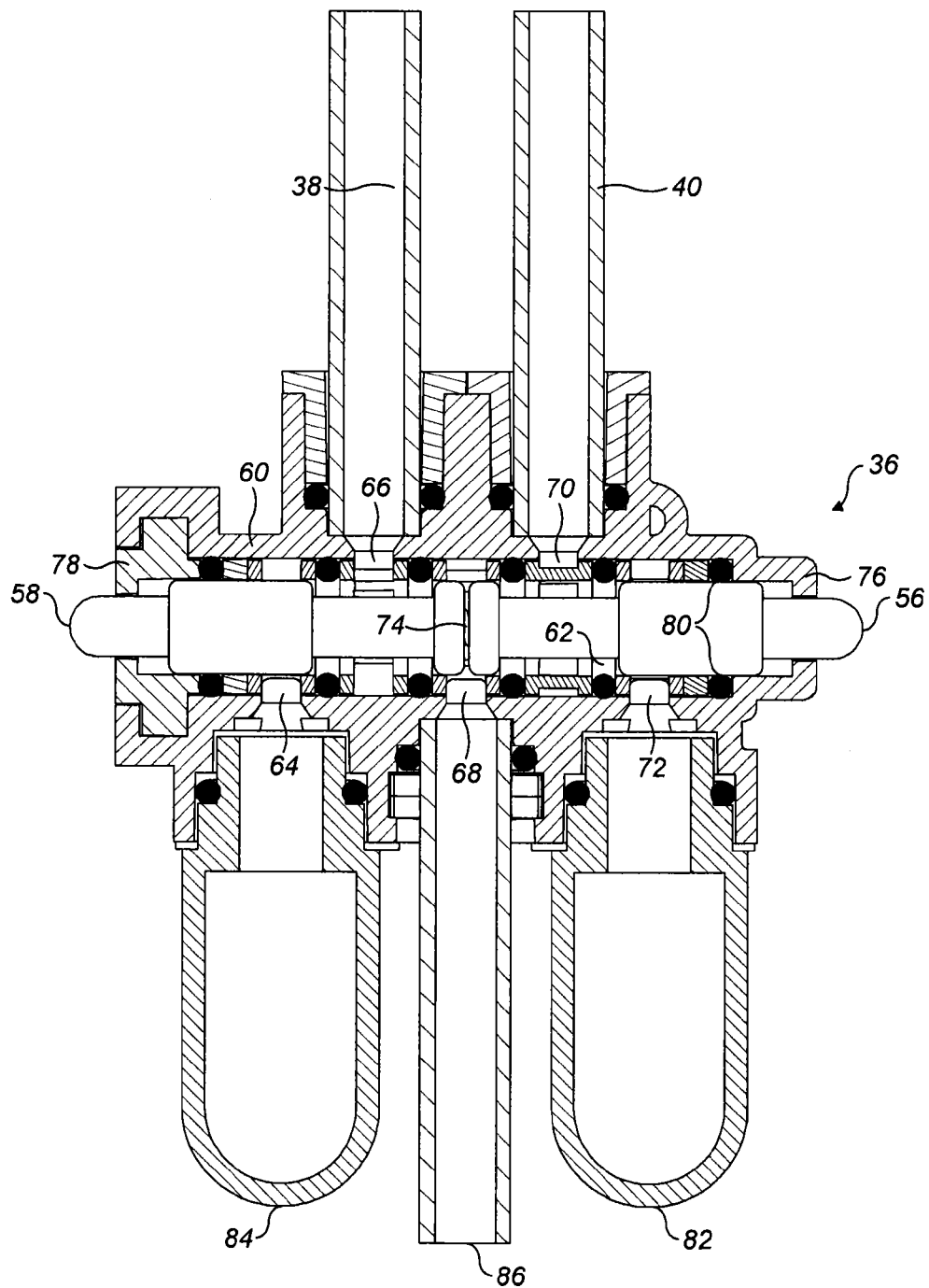
FIG. 7B depicts a cross-section of the valve arrangement in a configuration in which each of its two spools has been depressed.

With reference to FIG. 7A, in the free flow configuration, the drive spool 56 and the return spool 58 have each been moved by the same distance away from their position in the rest configuration towards each other until the spools abut each other. The spools are positioned such that fluidic communication between all of the ports is enabled. As a result, a substantial increase in pressure in the drive chamber 30 and/or the return chamber 34 is prevented by enabling fluidic communication between the drive chamber 30, the return chamber 34, the pressure inlet conduit 48 and the exhaust 50, causing pressurized fluid from the regulator 22 to vent through the exhaust 50.

The above described specific embodiment is manufactured from a combination of metal for the cylinder 4, the rods 10 and the cartridge holder 8 and plastic materials for the remaining structural components including the stock portion 6. The cylinder 4 and end plates at the distal end of the cartridge holder 8 are made of aluminium, and the rods 10 and the remainder of the cartridge holder 8 are made of steel. The plastic materials used are nylon or acetal, with glass fillers where required. It will be understood that any suitable combination of these materials, including construction with all structural parts made from plastic materials can be used in alternative embodiments. Numerous materials are suitable for use in the sealing parts such as O-rings, for pressure connecting hoses and tubes and other pneumatic components such as valves and connectors, as is well known to the person skilled in the art.

It will be understood that the above description of specific embodiments of the invention is by way of example only and it is not intended to limit the scope of the invention. Many modifications of the described embodiments, some of which are now described, are envisaged and intended to be covered by the appended claims.

While the specific embodiment described above has a valve connected with one exhaust port 68 and two inlet ports 64, 72, some embodiments have two exhaust ports and a single inlet port. With reference to FIGS. 4B, 5B, 6B and 7B, a dual exhaust embodiment is similar to the embodiment described above, with the main differences between the embodiments being that the dispenser 2 comprises a drive exhaust 82 arranged to relieve pressure from the drive chamber 30 and a return exhaust 84 arranged to relieve pressure from the return chamber 34, and that the pressure inlet conduit does not bifurcate, but has a common pressure inlet conduit 86 connected to one port of the valve 36, selectively in fluidic communication with the drive chamber 30 and the return chamber 34 via the drive conduit 40 and the return conduit 38, respectively. The lands and grooves of the spools are arranged differently from the specific embodiment described above, as shown, for example, in FIG. 4B, as a consequence of the different roles of the ports from one end of the valve 36 to the other.

The connections of the return operating port 66 and the drive operating port 70 are the same as in the embodiment described above, but the return exhaust 84 is connected to the return inlet port 64, which now acts as a return exhaust port, the common pressure inlet conduit 86 is connected to the exhaust port 68, which now acts as a common inlet port, and the drive exhaust 82 is connected to the drive inlet port 72, which now acts as a drive exhaust port.

As can be seen from FIGS. 4B, 5B, 6B and 7B, the spools are arranged such that the drive and return ports are connected to their respective exhaust ports in the rest configuration, the drive port is connected to the common inlet and disconnected from its exhaust port in the drive configuration, and analogously for the return port in the return configuration. As for the specific embodiment described above, all ports are connected in the free flow configuration.

In the free flow configuration, in some embodiments, the fluidic communication relationships between the ports are the same as the fluidic communication relationships described above for the rest configuration, e.g., for the specific embodiment described above with respect to FIG. 4A, fluidic communication between the return inlet port 64 and the return operating port 66 is prevented, and fluidic communication between the drive operating port 70 and the drive inlet port 72 is prevented.

In some embodiments, the drive spool 56 and the return spool 58 are biased apart by any kind of biasing means such as a resilient polymeric member. The resilient biasing need not be provided between the two spools but each could have its own resilient biasing member associated with it, for example between the spool and the valve housing. The valve has a different number of ports, in some embodiments, and in particular, in some embodiments, the valve has at least six ports, such that the drive conduit and the return conduit are each selectively in fluidic communication with their own dedicated inlet and exhaust.

In general, while the above description has been made in terms of a five port valve used in a dispenser, it will be understood that the invention is not limited in this way and extends to the valve as such, irrespective of its application. The valve will find useful application in many areas where it would be advantageous to combine the functionality of two three port valves in a single valve body, for example to save space, by sharing one of the ports of each notional three port valve. Such applications include, but are not limited to, applications where pressure needs to be applied to and vented from two separate chambers, whether the pressure is supplied from a common pressure source or from one respective pressure source for each chamber. Likewise, depending on the application, the ports of the valve may be placed differently about the longitudinal axis of the valve, for example all to one side or at different angles about the axis.

Turning now to the above description of a dispenser incorporating such a valve, while the specific embodiment described above is adapted for use with cartridges, in some embodiments, instead of the cartridge holder 8 as described above, the dispenser 2 comprises other kinds of holders, such as a holder to allow viscous material to be dispensed from a foil pack.

In some embodiments, the drive trigger 18 and the return trigger 20 are arranged the other way around, such that actuation of the trigger closer to the cylinder 4 causes the rods 10 to advance, and actuation of the trigger further from the cylinder 4 causes the rods 10 to retreat. In some embodiments, this is achieved by altering the mechanical links between the triggers and the valve 36, while in other embodiments, this is achieved by connecting the second drive conduit portion 46 to the conduit portion that is in fluidic communication with the return operating port 66 of the valve 36 (which then acts as a drive port), rather than the drive operating port 70 of the valve 36 (which then acts as a return port).

In some embodiments, the handle 14 comprises a seesaw switch having a first actuation surface on one side of the pivot, and a second actuation surface on the other side of the pivot, wherein depression of one surface causes the rods 10 to advance, and depression of the other surface causes the rods 10 to retreat.

While the wall of the cylinder 4 of the specific embodiment described above has an annular cross-section, in some embodiments, the cylinder 4 has a different cross-section, for example a non-annular cross-section, such as those defining a chamber of an ellipsoid or a polygonal (rounded or not) cross-section.

In some embodiments, the dispenser 2 comprises a drive regulator and a return regulator, for regulating the supply of pressurized fluid to the drive chamber 30 and the return chamber 34, respectively in the respect drive and return configurations, rather than a single regulator. The drive regulator is in fluidic communication with a port of the valve 36 via a drive inlet conduit, and the return regulator is in fluidic communication with another port of the valve 36 via a return inlet conduit. In some of these embodiments, the regulator is arranged such that the pressure applied to the drive chamber 30 in the drive configuration is higher than the pressure applied to the return chamber 34 in the return configuration. In some further ones of these embodiments, each regulator has its own dial for changing the amount of pressure applied to the respective chamber.

In some further embodiments, the drive conduit 40 comprises a flexible (e.g. coiled) tube attached to an aperture in the piston 28 instead of the second drive conduit portion 46 extending through an aperture in the piston 28 as described with reference to FIG. 2. The flexibility of the tube allows the connection with the piston 28 to remain in place as the piston 28 moves relative to the cylinder 4.

The above description of a specific embodiment of a dispenser above has been made in terms of a dispenser for two component cartridges having three rods and two plungers. It will be appreciated that the number and configuration of the rods are central to the description of the invention and that many other arrangements are possible within the scope of the invention, depending on the application at hand. For example, two rods and respective identical plungers arranged symmetrically about a central plane of the dispenser could be used for a two-component dispenser dispensing material in equal dispensing ratios or a single rod and plunger, for example arranged along a central axis of the cylinder 4, could be used for dispensing from single component, single barrel cartridges.

What is claimed is:

1. A dispenser comprising:
a handle housing a valve;
a cylinder secured with respect to the handle;
a piston moveable inside the cylinder, the piston dividing the cylinder into a front chamber and a rear chamber; and
a rod arranged to move with the piston, the rod extending from the piston through an aperture in a front end of the cylinder,
wherein the valve comprises a body and first and second independently moveable members linked to an actuation arrangement for controlling advance and retreat of the rod by actuation of a respective one of the first and second members, the actuation arrangement comprising a first trigger and a second trigger, wherein the first member is mechanically linked to the first trigger and the second member is mechanically linked to the second trigger, the body defining a valve chamber and first, second, third, fourth and fifth ports into the valve chamber, the second and fourth ports being connected to, respectively, the rear and front chamber and the first and second members being moveable within the valve chamber to selectively open and close fluidic communication paths between the ports, the first member being movable between two positions to selectively enable fluidic communication between the second port and either the first port or the third port, the second member being movable between two positions to selectively enable fluidic communication between the fourth port and either the third port or the fifth port, and wherein the first and second members are constrained to move along the same axis.

2. The dispenser of claim 1 wherein the ports are spaced relative to each other along the axis.

3. The dispenser of claim 1 wherein the first and second members are biased away from each other into respective rest positions.

4. The dispenser of claim 3 wherein a resilient biasing member is disposed between the first and second members.

5. The dispenser of claim 3 wherein the members are dimensioned such that the possible travel of each of the members is determined by the position of the other one of the members.

6. The dispenser of claim 5 wherein the members are arranged to contact each other if one of the members is fully inserted into the chamber.

7. The dispenser of claim 3 wherein the first, third and fifth ports are in fluidic communication in configurations of the first and second members with both the first and second members positioned away from their respective rest positions.

8. The dispenser of claim 3 wherein when the first and second members are in their respective rest positions, fluidic communication is enabled between the second port and the third port, and between the third port and the fourth port, and fluidic communication is prevented between the first port and the second port, and between the fourth port and the fifth port;
when the first member is positioned as closely as possible to the second member while the second member remains in its rest position, fluidic communication is enabled between the second port and the third port, and between the fourth port and the fifth port, and fluidic communication is prevented between the first port and the second port, and between the third port and the fourth port;
when the second member is positioned as closely as possible to the first member while the first member remains in its rest position, fluidic communication is enabled between the first port and the second port, and between the third port and the fourth port, and fluidic communication is prevented between the second port and the third port, and between the fourth port and the fifth port; and
wherein there is no configuration of the first and second members wherein fluidic communication is enabled between the first port and the second port, and between the fourth port and the fifth port, without at least one of the second port and the fourth port also being in fluidic communication with the third port.

9. The dispenser of claim 3 wherein when the first and second members are in their respective rest positions, fluidic communication is enabled between the first port and the second port, and between the fourth port and the fifth port, and fluidic communication is prevented between the second port and the third port, and between the third port and the fourth port;
when the first member is positioned as closely as possible to the second member while the second member remains in its rest position, fluidic communication is enabled between the first port and the second port, and between the third port and the fourth port, and fluidic communication is prevented between the second port and the third port, and between the fourth port and the fifth port;
when the second member is positioned as closely as possible to the first member while the first member remains in its rest position, fluidic communication is enabled between the second port and the third port, and between the fourth port and the fifth port, and fluidic communication is prevented between the first port and the second port, and between the third port and the fourth port; and
wherein there is no configuration of the first and second members wherein fluidic communication is enabled between the second port and the third port, and between the third port and the fourth port, without the first port being in fluidic communication with the second port and/or the fourth port being in fluidic communication with the fifth port.

10. The dispenser of claim 1 wherein the first port and the fifth port are connected to a pressure supply arrangement and the third port is connected to an exhaust arrangement.

11. The dispenser of claim 10 wherein the exhaust arrangement comprises a silencer.

12. The dispenser of claim 10 wherein the pressure supply arrangement comprises a respective pressure regulator for each of the first and fifth ports.

13. The dispenser of claim 1 further comprising a holder for holding a container containing viscous material to enable application of a dispensing force to the container as the rod advances, to dispense at least some of the viscous material from the container.

* * * * *